Patented June 5, 1923.

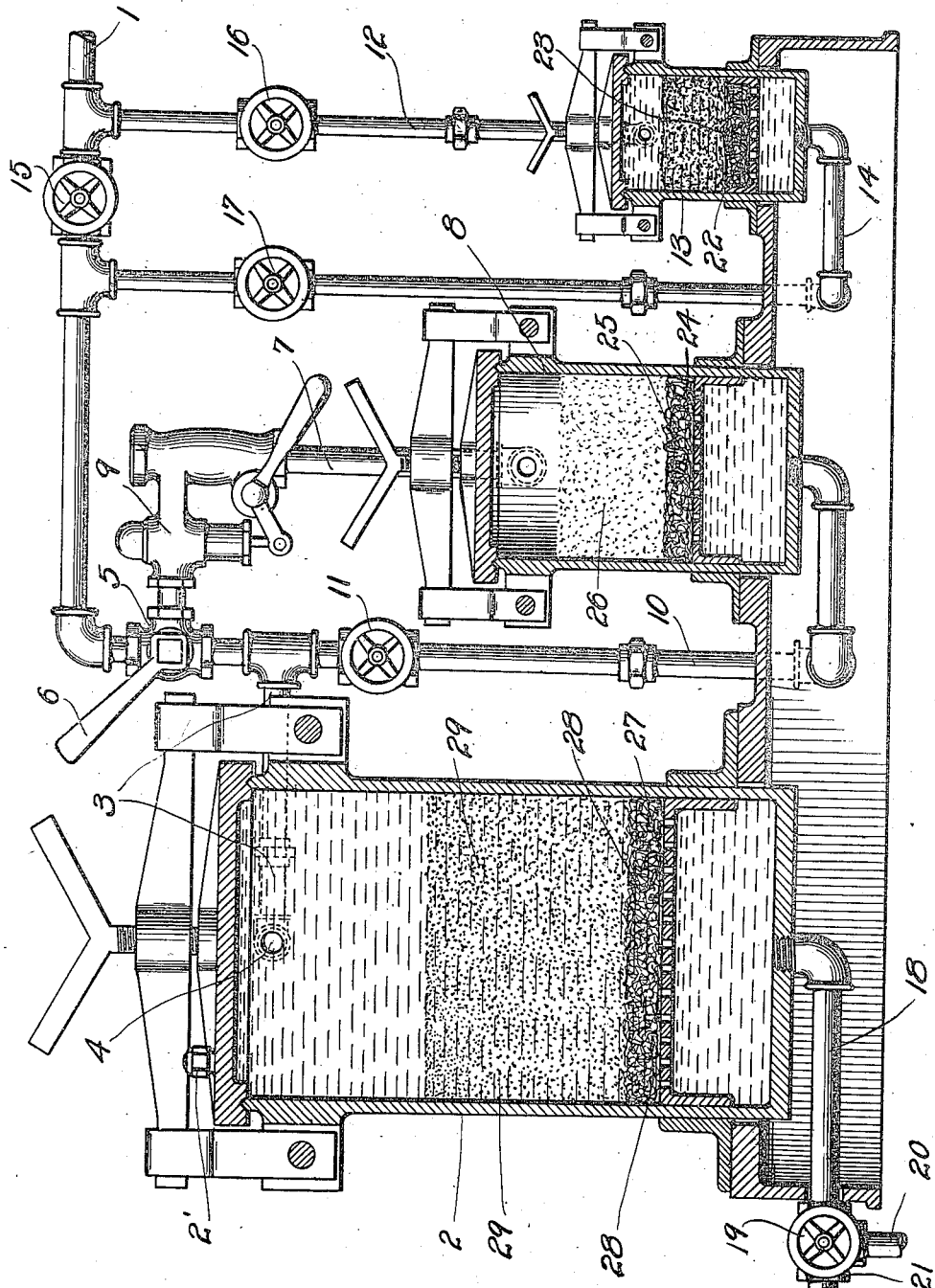

1,457,503

UNITED STATES PATENT OFFICE.

WALTER M. CROSS, OF KANSAS CITY, MISSOURI, ASSIGNOR TO MYRTLE B. CAPS, OF WILMETTE, ILLINOIS.

METHOD OF AND APPARATUS FOR THE PURIFICATION OF WATER.

Application filed May 26, 1920. Serial No. 384,301.

*To all whom it may concern:*

Be it known that I, WALTER M. CROSS, a citizen of the United States, residing at Kansas City, in the county of Jackson and State of Missouri, have invented certain new and useful Improvements in Methods of and Apparatus for the Purification of Water; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a method of and apparatus for purifying water.

The invention consists essentially of treating water by the use of hydrous silicates of iron for removing the hardness therefrom. The particular hydrous silicate which I prefer to use is the natural substance known as glauconite, green sand and green sand marl. This substance occurs in nature in abundant quantities notably in Kentucky, Utah, Virginia and Tennessee. Similar hydrous silicates occur in many localities where igneous rocks are found. A rather typical glauconite has the following composition:

| | Per cent. |
|---|---|
| Silica ($SiO_2$) | 51.7 |
| Alumina ($Al_2O_3$) | 6.5 |
| Iron oxide (FeO) | 21.2 |
| Potash ($K_2O$) | 11.3 |
| Carbonate of lime ($CaCO_3$) | 2.0 |
| Combined water ($H_2O$) | 7.3 |
| | 100.0 |

This material when left in contact with water containing lime and magnesia takes up the calcium and magnesium from the water and releases a combining equivalent of alkali (sodium or potassium). In time so much calcium and magnesium may be taken up that the material ceases to be active in this respect. However, by subjecting it to the action of strong brine or solution of sodium chloride the reaction is reversed and the sodium is substituted for the calcium and magnesium. The original water softening power is then restored. This method has the obvious advantage over the ordinary chemical dosing of water in that there is no danger from overtreating as the action ceases when the hardness has been removed.

I find in the use of glauconite or green sand that the water shows a slight greenish turbidity in some instances although the hardness has been completely removed. This is not desirable and may be overcome by the use of a very small amount of alum or any water soluble salt of aluminum in the water that is being softened before it is brought into contact with the green sand. This action is similar to that in the use of alum for water clarification by filtration.

It is often desirable to treat water that is bacterially contaminated as well as hard, in which case sterilization by means of free chlorine or its active combinations may be used in conjunction with the softening and filtration.

I am aware that both natural and artificial zeolites have been used successfully for the softening of water but these substances are aluminum compounds without an appreciable quantity of iron and are less active. They do not occur in the large quantities in which the iron compounds are found.

The method by which I accomplish the desired result will be better understood by reference to the accompanying drawings in which—

The figure is a sectional view through certain containers conveniently adaptable for use in carrying out my method, certain connecting pipes and valves being shown in elevation.

Referring now to the drawings by numerals of reference:

1 designates a pipe or conduit which is to be connected to a suitable source of supply (not shown) and said pipe is adapted to communicate with a receptacle 2 through a branch pipe 3, communicating with an inlet 4 of the receptacle 2, located near the top thereof. There is a three-way valve 5 in the pipe 1 adapted to be operated by a handle 6. The valve 5 is adapted to divert the water from the conduit 1 through the branch pipe 7, communicating with the receptacle 8. The branch pipe 7 contains a dosing valve 9, which may be manually opened after the three-way valve 5 is opened to divert the water from pipe 1 to pipe 7 and into the receptacle 8. The dosing valve 9 is arranged to automatically close after a predetermined amount of water has passed into 7 and into the receptacle 8. Therefore, measured quantities of water may be introduced into the receptacle 8, dependent upon the length of time it takes the valve 9 to close. This is an advantage because if the operator is careless and leaves the valve 5 open to branch 7 longer than required, the valve 9 will cut off the supply to the receptacle 8 and thereby prevent all of the salts from being washed out into the receptacle, which is in communication with 8 through the discharge pipe 10 connected to the branch pipe 3. There is also a valve 11 in the discharge pipe 10 which may be opened when the pipe 1 is closed to branch 3 and closed when the pipe 1 is open to branch 3.

The pipe 1 is adapted to discharge into a branch pipe 12 communicating with a receptacle 13 having a discharge port 14 communicating with the pipe 1 on the off-side of the valve 15 between pipes 12 and 14. The valve 15 is adapted to be only partially unseated so that if desired some of the water passing through pipe 1 into the receptacle 2 will be diverted through 12 and through receptacle 13 and back into pipe 1 through pipe 14.

I may also provide the pipes 12 and 14 with valves 16 and 17 if desired, these valves being adapted to control the flow through pipes 12 and 14 and they are also adapted to close the pipes 12 and 14 in the event that it is desirable to have access to the receptacle 13 for the purpose of inspection or repairs.

The receptacle 2 is provided with a discharge pipe 18 in which is a three-way valve 19 whereby the water passing from the receptacle 2 may be directed into a sewerage system through pipe 20 or directly to another source for industrial purposes through the pipe 21.

The receptacle 13 is provided with a bed support or grid 22, upon which is a bed 23 of fibrous material, such as asbestos or glass wool, and this bed supports a body of calcium hypochlorite, which partially fills the receptacle 13, as shown. The receptacle 8 also has a bed-supporting grid 24, on which is preferably a bed of similar fibrous material 25, supporting a body of common salt 26, and the receptacle 2 is provided with a bed support 27 supporting a bed 28 of asbestos or similar material, on which is a body 29 of glauconite or green sand. The top of the green sand is below the top of the receptacle 2.

Assuming that all of the valves are closed off and it is desired to pass water through the apparatus just described, in order to carry out the method the valves 15, 15 and 5 will be opened so that the major portion of the water may pass through pipe 1 into the receptacle 2 through the branch 3. The valve 15 will not be wholly unseated because it will be desired to slightly retard the flow of the water through pipe 1 and thereby divert some of it through pipe 12 into the receptacle 13, through the bed of calcium hypochlorite, through pipe 14 and back into 1 before it reaches the receptacle 2, where the actual softening of the water takes place. The valve 16 should be open just enough to allow the right amount of alum and calcium hypochlorite to be introduced into the water issuing from the receptacle 13 so that the water issuing from the receptacle 2 will be soft and clear.

Whenever the reaction set up in the receptacle is such that the water issuing through pipe 18 becomes hard, as indicated by its action on the soap, the glauconite or hydrous silicates of iron require to be regenerated, then valves 16 and 17 are closed and valve 5 turned so as to direct the water from 1 through the valve 9 and pipe 7 into the receptacle 8. The valve 11 is then opened and the water entering the receptacle 2 will have passed through the receptacle 8 containing the salt but this water is not ordinarily permitted to enter the receptacle 2 until the receptacle 2 has been previously emptied.

In order to empty the receptacle 2 I may employ an automatically operating vent valve 2′ which may be conveniently placed in the top of the receptacle 2. I may find this necessary when the valves 5 and 11 are closed to receptacle 2 because the admission of air into the top of the receptacle 2 will facilitate the emptying thereof. By emptying the receptacle 2 before the saline solution passes into it, the concentrated solution will more quickly attack the glauconite. The device can operate successfully, however, without the valve 2′; in which event it may be necessary to introduce two or more doses of saline solution into the receptacle 2 because the liquid already contained in 2 will dilute it.

After the receptacle 2 is emptied, the valve 19 may be closed and the valve 11 opened to allow the brine solution to fill the container 2 to act upon the glauconite and supply the necessary salts. Then the valve 19 may be slightly opened to allow a quantity of brine water to run out. The valve 11 may then be closed and the three-way valve 5 opened to admit the water directly from the service pipe 1 into the receptacle 2 through the branch pipe 3, cutting out the receptacle. The valve 19 will be only slightly open at this time to allow the water from pipe 1 to slowly wash out the glauconite, whereupon the device will be again ready for use and will operate as previously described.

Attention is called to the fact that the beds in the receptacles or containers 2, 8 and 13 are filter beds, through which the liquid passes and that the valves 15, 16 and 17 may be controlled so that there will be a minor flow of alum salt solution from the receptacle 13 into the pipe 1 to co-mingle with the main flow of water through pipe 1 before it enters the receptacle 2. Therefore, the sodium chloride or salt in receptacle 8 is only brought into use when it is desired to regenerate the bed 29 of glauconite.

What I claim and desire to secure by Letters-Patent is:

1. An apparatus for treating water comprising a receptacle having an inlet and an outlet, a glauconite bed in said receptacle, a second receptacle having an inlet and an outlet, a calcium hypochlorite bed in said receptacle through which liquid flows from the inlet to the outlet, means for connecting the outlet of the second receptacle with the inlet of the first receptacle, a third receptacle, a saline bed in the third receptacle, a water inlet for the third receptacle, and means connecting the outlet of the third receptacle with the inlet of the first receptacle.

2. An apparatus for treating water comprising a receptacle having an inlet and an outlet, a glauconite bed in said receptacle, a second receptacle having an inlet and an outlet, a calcium hypochlorite bed in said receptacle in which the liquid flows from the inlet to the outlet, means for connecting the outlet of the second receptacle to the inlet of the first receptacle, a third receptacle, a saline bed in the third receptacle, a water inlet for the third receptacle, a conduit leading from the third receptacle to the first receptacle, and a measuring valve in the inlet for the second receptacle.

3. An apparatus for treating water comprising a receptacle having an inlet and an outlet, a glauconite bed in said receptacle, a calcium hypochlorite container, a conduit between the calcium hypochlorite container and the glauconite receptacle, a saline-containing receptacle, means for connecting the saline receptacle to the first receptacle, an inlet pipe for conveying water to the saline receptacle, and a measuring valve in the inlet pipe of said saline receptacle.

4. The process of softening water which consists in adding minute quantities of a solution of aluminum salts to the water and passing the treated water through a bed of glauconite, the aluminum salts being effective in fixing the iron in the glauconite so that the water passing through the glauconite bed will be clear.

5. The process of softening water which consists in passing the water through a bed of glauconite in which the iron content has been fixed so that the water passed through the bed will be clear.

6. The process of softening water which consists in passing the water through a bed of glauconite and simultaneously treating the glauconite bed so that the iron content thereof will be fixed to prevent the iron being carried through the bed by the water.

7. The process of purifying water which consists in adding to the water minute quantities of solutions of aluminum salts and active chlorine compounds, filtering this water through a water filtering and softening bed containing hydrous silicates of iron and alkali, the aluminum salts and active chlorine compounds being effective in fixing the hydrous silicates of iron and alkali in the bed so that they will not pass off with the water, regenerating the hydrous silicates of iron and alkali with brine solutions, and again using the regenerated hydrous silicates of iron and alkali for the treatment of water.

In testimony whereof I affix my signature.

WALTER M. CROSS.